(12) United States Patent
Bernard et al.

(10) Patent No.: US 11,673,301 B2
(45) Date of Patent: Jun. 13, 2023

(54) COMPOSITE CONNECTORS AND METHODS OF MANUFACTURING THE SAME

(71) Applicant: Crompton Technology Group Limited, Solihull (GB)

(72) Inventors: James William Bernard, Brackley (GB); Nathaniel M. Gray, Stratham, NH (US)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 577 days.

(21) Appl. No.: 16/718,257

(22) Filed: Dec. 18, 2019

(65) Prior Publication Data

US 2020/0316830 A1 Oct. 8, 2020

(30) Foreign Application Priority Data

Apr. 2, 2019 (EP) .................................. 19275041

(51) Int. Cl.
*F16L 57/00* (2006.01)
*B29C 45/00* (2006.01)
(Continued)

(52) U.S. Cl.
CPC .......... *B29C 45/0005* (2013.01); *B29C 45/73* (2013.01); *B29C 70/443* (2013.01); *F16L 9/133* (2013.01); *F16L 57/00* (2013.01)

(58) Field of Classification Search
CPC ......... F16L 9/133; F16L 23/032; F16L 57/00; F16L 9/12; F16L 47/14; F16L 47/28; F16L 47/20; F16B 9/052; F16B 47/20
(Continued)

(56) References Cited

U.S. PATENT DOCUMENTS 4,451,528 A * 5/1984 Krause .................... B29C 70/46
428/408
4,514,244 A * 4/1985 Shaefer ................. F16L 43/008
156/304.6
(Continued)

FOREIGN PATENT DOCUMENTS

CN 1784300 A 6/2006
EP 3428499 A1 1/2019
(Continued)

OTHER PUBLICATIONS

EPO Official Letter for Application No. 19275041.2, dated Dec. 21, 2021, 6 pages.
(Continued)

*Primary Examiner* — Patrick F Brinson
(74) *Attorney, Agent, or Firm* — Cantor Colburn LLP

(57) ABSTRACT

A method of manufacturing a composite connector for a fluid transfer conduit is provided which comprises applying continuous fibre reinforcement, oriented at least partially circumferentially and pre-impregnated with a thermoplastic polymer to a tubular mould portion which extends substantially parallel to a central axis C; applying at least one further mould portion to form a complete mould in which the continuous fibre reinforcement is enclosed and injecting a thermoplastic polymer into the mould to form a connector with a tubular hub portion and a flange portion which extends from the hub portion at an angle to the central axis C. The tubular hub portion comprises a tubular seal section with an inner layer and an outer wherein the inner layer comprises the continuous fibre reinforcement and the outer layer comprises the injected thermoplastic polymer.

11 Claims, 8 Drawing Sheets

(51) Int. Cl.
*B29C 45/73* (2006.01)
*B29C 70/44* (2006.01)
*F16L 9/133* (2006.01)

(58) Field of Classification Search
USPC ........ 138/109, 172, 174, 110, 153; 285/423, 285/405
See application file for complete search history.

(56) References Cited

U.S. PATENT DOCUMENTS

| | | | | |
|---|---|---|---|---|
| 4,605,385 | A * | 8/1986 | Puck | F16L 9/12 |
| | | | | 464/181 |
| 6,361,080 | B1 * | 3/2002 | Walsh | F16L 47/14 |
| | | | | 285/55 |
| 9,222,605 | B2 | 12/2015 | Ciolczyk et al. | |
| 2006/0141838 | A1 * | 6/2006 | Kertesz | B29C 45/14778 |
| | | | | 439/272 |
| 2011/0101686 | A1 * | 5/2011 | Dalmolen | F16L 33/01 |
| | | | | 285/423 |
| 2011/0290366 | A1 * | 12/2011 | Dewhirst | B29C 43/021 |
| | | | | 264/285 |
| 2012/0181384 | A1 | 7/2012 | Courpet et al. | |
| 2012/0286505 | A1 | 11/2012 | Barre et al. | |
| 2015/0284035 | A1 | 10/2015 | Reese | |
| 2016/0273696 | A1 | 9/2016 | Gonzalez Bayon et al. | |
| 2017/0370506 | A1 * | 12/2017 | Rusch | F16L 23/00 |
| 2020/0049282 | A1 * | 2/2020 | Giannakopoulos | B29C 70/48 |
| 2020/0049283 | A1 * | 2/2020 | Chase | B29C 70/462 |

FOREIGN PATENT DOCUMENTS

| | | | | |
|---|---|---|---|---|
| EP | 3608091 A1 | 2/2020 | | |
| EP | 3608092 A1 | 2/2020 | | |
| EP | 3608093 A1 | 2/2020 | | |
| EP | 3608094 A1 * | 2/2020 | | B29C 33/00 |
| EP | 3608095 A1 * | 2/2020 | | B29C 53/566 |

OTHER PUBLICATIONS

European Search Report for Application No. 19275041.2, dated Oct. 24, 2019, 9 pages.
Chinese Office Action for CN Application No. 201911298751.5, dated Oct. 9, 2022, pp. 1-9.
CN 1784300 Machine Translation, Published: Jun. 7, 2006, 13 pages.
Machine Translation of CN Chinese Office Action for CN Application No. 201911298751.5, dated Oct. 9, 2022, 10 pages.

* cited by examiner

COMPOSITE CONNECTORS AND METHODS OF MANUFACTURING THE SAME

FOREIGN PRIORITY

This application claims priority to European Patent Application No. 19275041.2 filed Apr. 2, 2019, the entire contents of which is incorporated herein by reference.

TECHNICAL FIELD

The present disclosure relates to composite (e.g. fibre-reinforced polymer) connectors e.g. for connecting fluid transfer conduits to other structures, and to methods of manufacturing composite (e.g. fibre-reinforced polymer) connectors for fluid transfer conduits.

BACKGROUND

Fluid transfer conduits (e.g. fuel pipes) are typically connected to other fixed structures (e.g. inside aeroplane wings) using one or more connectors. To allow for movement of the fixed structure without inducing large stresses on the fluid transfer conduit itself (e.g. as a wing flexes during flight), such connectors are designed to tolerate a small amount of relative movement between the fluid transfer conduit and the structure whilst still effectively supporting the conduit and sealing the connection. This is often achieved using an elastomeric O-ring, on which the fluid transfer conduit "floats", to seal the connection while allowing a small amount of relative motion.

In many applications, such connectors are required to withstand large circumferential loads (e.g. due to high internal pressures in a fluid transfer conduit) as well as other stresses. To provide the requisite strength while minimising part count, connectors are conventionally machined from a single block of metal (usually aluminium). However, this process results in a large amount of material being wasted (i.e. a very high so-called buy-to-fly ratio).

Furthermore, fluid transfer conduits are increasingly being constructed from composite materials (e.g. fibre-reinforced polymers), in order to save weight and reduce material costs. However, when used with metallic connectors, composite fluid transfer conduits can experience various problems such as galvanic corrosion and a reduced temperature operating window due to unequal thermal expansion.

More recently, therefore, an alternative manufacturing technique has been developed whereby composite connectors are produced by injection moulding a thermoplastic matrix reinforced with randomly oriented chopped fibres (e.g. carbon/glass/aramid fibres). US 2016/0273696 describes an example of a composite part injection-moulded from a thermoplastic matrix reinforced by chopped fibres. Because injection moulding is an additive process, it results in less wasted material during manufacture compared with conventional metal machining techniques. In addition, chopped-fibre reinforced composite parts are typically lighter than their metal equivalents. However, injection moulded connectors reinforced with chopped fibres often cannot provide a high quality seal, because such connectors typically must feature a tapered inner surface to allow them to be extracted from the injection moulding tool after manufacture. This taper can lead to sealing problems. The taper can be machined straight, but this requires an additional manufacturing step and the resulting surface finish is not as smooth as a moulded surface, significantly diminishing the integrity of the seal and thus the performance of the finished connector.

SUMMARY

According to one aspect of the present disclosure, there is provided a method of manufacturing a composite connector for a fluid transfer conduit, the method comprising: applying continuous fibre reinforcement, oriented at least partially circumferentially and pre-impregnated with a thermoplastic polymer to a tubular mould portion which extends substantially parallel to a central axis; applying at least one further mould portion to form a complete mould in which the continuous fibre reinforcement is enclosed; injecting a thermoplastic polymer into the mould to form a connector with a tubular hub portion and a flange portion which extends from the hub portion at an angle to the central axis; wherein the tubular hub portion comprises a tubular seal section with an inner layer and an outer layer, wherein the inner layer comprises the continuous fibre reinforcement and the outer layer comprises the injected thermoplastic polymer.

From a second aspect of the present disclosure, there is provided a composite connector for a fluid transfer conduit comprising: a tubular hub portion which extends substantially parallel to a central axis and comprises a tubular seal section; a flange portion which extends from the hub portion at an angle to the central axis; wherein the seal section of the hub portion comprises an inner layer and an outer layer, the inner layer comprising thermoplastic polymer reinforced with continuous fibre oriented at least partially circumferentially and the outer layer comprising injection-moulded thermoplastic polymer.

The use of continuous fibre oriented at least partially circumferentially and pre-impregnated with thermoplastic polymer (commonly referred to as "pre-preg") in the seal section facilitates manufacture and increases the reliability of a seal with the fluid transfer conduit). Utilising injection moulding for the rest of the connector reduces the cost of manufacture and facilitates the creation of complex connector shapes. An injection moulding process can also make it easier to add surface features, such as ribs or tags, as discussed further below.

Because the continuous fibre reinforcement is only applied to the tubular mould portion (e.g. in a cylindrical simple shape), complex and expensive fibre laying techniques (e.g. Automated Fibre Placement or AFP) are not required. In some examples, the pre-preg fibre reinforcement may be provided as a strip with a width equal to a desired seal section length, and applying the fibre reinforcement to the mould may comprise simply winding the strip around the tubular mould portion one or more times (i.e. a simple roll-up laying technique). This is particularly convenient as pre-preg fibre is typically provided as sheets having a large width (e.g. 600 mm). Such sheets can be readily slit down to the required width for applying to the mould such that the application of the pre-preg fibre to form the continuous fibre layer is a very simple process.

In some examples the tubular mould portion comprises at least a first tubular part and a second tubular part. In such examples, the first tubular part corresponds to the tubular seal section of the resulting connector. In some such examples the continuous fibre reinforcement may be applied only to the first tubular part (i.e. the second and any additional tubular parts of the tubular mould portion may not have any continuous fibre applied thereto). The first and second tubular parts preferably both extend substantially parallel to the central axis. The first tubular part may extend from an end of the second tubular part along the central axis (i.e. the tubular parts may be adjacent to each other on the central axis without overlapping). The first tubular part may be located, for example, at an end of the tubular mould portion (corresponding to an end of the resulting connector), or in close proximity to the end of the tubular mould portion.

The continuous fibre reinforcement oriented at least partially circumferentially in the seal section may provide high hoop (circumferential) strength, giving the connector high resistance to high hoop loads (e.g. due to high pressure fluid within a fluid transfer conduit connected thereto).

The method disclosed herein is additive, meaning that the connector may be produced using less raw material than conventional metal connectors (which are typically produced by removing material from a much larger raw material blank). Furthermore, the use of fibre-reinforced polymer means that the weight of the connector may also be reduced compared to conventional metal connectors. In many applications, such as the aerospace industry, any weight saving is highly advantageous as it can lead to significant fuel (and thus cost) savings over the lifetime of a part.

The use of continuous fibre reinforcement oriented at least partially circumferentially also stiffens the seal section. When fluid at high pressure is passed through a fluid transfer conduit connected thereto, this stiffness mitigates hoop expansion of the composite connector, ensuring that a good connection and seal is maintained at all times.

"Continuous" fibre reinforcement is used herein to refer to fibre reinforcement in which at least some individual constituent filaments have a substantial length, i.e. they are not short "chopped fibres". In at least some examples, the fibre reinforcement may be considered to be "continuous" when the fibres or filaments have a length on the same scale as the part they are reinforcing. This means that the fibre reinforcement is substantially "continuous" when it extends uninterrupted across a given dimension of a part, such as a length, radius or circumference.

The continuous fibre reinforcement in the seal section is oriented at least partially circumferentially, in that it comprises at least some individual constituent filaments that extend at least partially circumferentially (i.e. non-axially). In some sets of examples at least some individual constituent filaments may extend only circumferentially, with little or no axial extent (i.e. they may extend at an angle of close or equal to 90° to the central axis). In some examples at least some individual constituent filaments may extend partially circumferentially and partially axially (i.e. helically, or extending at an angle between 0° and 90° to the central axis). The continuous fibre reinforcement may comprise a plurality of individual constituent filaments extending around the seal section at different angles to the central axis.

The continuous fibre reinforcement typically makes an angle of more than 60° to the central axis. In some examples the continuous fibre reinforcement extends at an angle of 65° to the central axis or more, e.g. at least 70°, 80°, 85°, or even at or close to 90°. A high angle maximises the hoop strength provided by the continuous fibre reinforcement.

The continuous fibre reinforcement in the seal section preferably comprises at least some individual constituent filaments which extend entirely around the circumference of the seal section, e.g. extending up to 360° around the central axis, and even further preferably making several complete loops around the central axis of the seal section.

The first layer of the tubular seal section preferably extends entirely around an inside surface of the tubular hub portion.

Injection moulding processes such as that used in the method disclosed herein typically involve molten (i.e. heated) thermoplastic polymer (e.g. up to or exceeding 400° C.) being injected into the mould under high pressure (e.g. up to or exceeding 2000 bar or 200 MPa, which may for example be achieved with a screw injection mechanism). The mould itself is typically made of metal and may also be heated, e.g. before the pre-preg fibre is applied. The inventors have recognised that exposing the pre-preg continuous fibre reinforcement to these high temperatures and pressures during the injection of the thermoplastic polymer may also serve to consolidate the pre-preg fibre (i.e. injecting the thermoplastic polymer may also consolidate the pre-impregnated continuous fibre-reinforcement). Consolidating the pre-preg fibre helps to remove any air trapped within the fibre, eliminate inter-laminar voids, improve the structural repeatability and control the dimension of the moulded component and ensure a smooth surface finish). This means that there is no need for a separate pre-consolidation step before the pre-preg continuous fibre is applied to the mould (which can be complicated, time consuming and expensive).

As mentioned above, the connector according to the present disclosure is suitable for use with a fluid transfer conduit (e.g. to connect a fluid transfer conduit to other structures). The present disclosure thus extends to a connection system comprising the connector as disclosed herein and a fibre-reinforced polymer fluid transfer conduit connected to the hub portion.

The composite connector of the present disclosure is suitable for use in connection systems comprising both connector-in-conduit arrangements (i.e. where at least some of the seal section is arranged to extend into the fluid transfer conduit) and conduit-in-connector arrangements (where at least some of the fluid transfer conduit extends into the seal section). The inner layer may provide a sealing surface for sealing a connection between the connector and the fluid transfer conduit (i.e. for conduit-in-connector arrangements). In such examples the sealing surface preferably has a low coefficient of friction to ensure a reliable seal is made with the fluid transfer conduit.

As mentioned above, an elastomeric O-ring may be used to seal a connection between the connector and a fluid transfer conduit. In such cases the O-ring may be positioned between an inner or an outer surface of the fluid transfer conduit and an inner or outer surface of the hub portion, to seal the connection. Optionally, the elastomeric O-ring is seated between a pair of retaining ridges on one of the connector or the fluid transfer conduit and the O-ring slides on a smooth surface of the other. For example, in connector-in-conduit arrangements, the retaining ridges may be formed on an outer surface of the connector (i.e. formed as part of the injection-moulded outer layer). Conversely, in conduit-in-connector arrangements, the retaining ridges may be formed on an outer surface of the conduit, with the inner layer of the hub portion providing a low-friction sealing surface along which the O-ring can move with little resistance, as explained above. The strong and stiff seal section keeps the O-ring tightly pressed radially between the connector and the conduit, ensuring the integrity of the seal.

In examples where the inner layer provides the sealing surface, the sealing surface preferably has an axial seal length (parallel to the central axis), to allow for axial movement between the fluid transfer conduit and the connector (i.e. such that the seal can be maintained with the O-ring in a variety of axial positions). Preferably, the sealing surface has a low coefficient of friction (e.g. the sealing surface has an "as-moulded" smooth finish formed by contact with the smooth surface of the mould tool), to allow the O-ring to slide along the sealing surface to enable this axial movement, without twisting (which can produce shear stresses on the O-ring, leading to spiraling O-ring failures). The sealing surface is preferably parallel to the central axis across the axial seal length, such that the distance between the outer surface of a fluid transfer conduit and the sealing surface is the same for any relative position of the conduit and the connector, enabling a consistent seal integrity across the entire axial range of the connector. As well as accommodating axial movement, this also enables the connector to handle some articulation of the conduit (i.e. rotation of the conduit such that it no longer extends parallel to the central axis of the connector), without breaking the seal.

In general, a more precisely parallel sealing surface (to the central axis) and/or a lower friction sealing surface puts less strict requirements on quality (and thus cost) of the O-ring to maintain a satisfactory seal.

The hub portion is preferably arranged to fit onto or into a fluid transfer conduit, e.g. concentric therewith, with a conduit fitting over an outer diameter of the hub portion or inside an inner diameter of the hub portion. The flange portion is preferably arranged to attach to a further structure and may comprise one or more attachment points therefor.

Because of the high proportion of continuous fibre oriented at least partially circumferentially in the seal section, when the seal section is subject to a change in temperature (e.g. due to heated thermoplastic polymer being injected into the mould and its subsequent cooling), the hoop expansion/contraction is dominated by the expansion/contraction of the fibre reinforcement. Fibres used as reinforcement in such materials typically have a very low CTE compared to the polymer matrix. For example, glass fibres have a CTE of around $1.6$-$2.9 \times 10$-$6$ K-1 and carbon fibres have a CTE which is very close to zero (and may even be negative, e.g. roughly $-0.5 \times 10$-$6$ K-1), while a typical polymer resin has a CTE of $\sim 50 \times 10$-$6$ K-1 (for comparison, aluminium has a CTE of $\sim 23 \times 10$-$6$ K-1). As a result, the hoop thermal expansion/contraction of the inner layer of the seal section is usually minimal.

In contrast, the coefficient of thermal expansion (CTE) of non-reinforced or chopped-fibre-reinforced thermoplastic polymers is dominated by the CTE of the resin matrix and is therefore much higher than continuous fibre-reinforced polymer (FRP) oriented at least partially circumferentially. It is also higher than the CTE of many metals (such as those used in injection moulds) and as such, injection moulded thermoplastic polymers may contract more than the mould used to form them as they cool and solidify before extraction.

Thus, in conventional entirely injection-moulded connectors, any element of the connector which encloses a metal mould portion (e.g. a tubular hub portion formed around a tubular mould portion) must be tapered so that the connector can be extracted from the mould even when the connector contracts more than the mould during cooling. A sealing surface of such a connector must thus be tapered, which leads to the seal integrity between connector and conduit varying as the conduit moves axially relative to the connector (as the distance between the connector's sealing surface and conduit outer surface changes).

However, in examples of the present disclosure, the inner layer of the hub portion comprises continuous fibre-reinforcement oriented at least partially circumferentially. As such, the inner layer undergoes little or no contraction as the mould and connector cool, allowing for simple extraction without requiring a taper. As explained below in more detail, the integrity of the resultant seal between the connector and a conduit is therefore constant no matter the axial position of the conduit relative to the connector.

Whist it may be possible to remove the taper of an injection moulded connector in a subsequent method step (e.g. by machining away material), this adds time and expense to manufacture. Furthermore, a machined surface typically has a much higher coefficient of friction than a moulded surface which, as mentioned above, can cause spiraling O-ring failures.

Fluid transfer conduits for which the connector of the present disclosure is particularly suitable are composite parts manufactured from fibre-reinforced polymers comprising a high proportion of circumferentially-oriented fibres. This maximises the hoop strength and thus the internal pressure tolerance of the conduit (which is particularly important in high pressure systems such as fuel pipes), while minimising weight.

In addition to the strength and stiffness benefits, utilising continuous fibre reinforcement oriented at least partially circumferentially in the seal section also enables the coefficient of thermal expansion (i.e. the "hoop" CTE) of the seal section to be closely matched to that of a fluid transfer conduit to which it may be connected.

Conventional connectors therefore, when used with fibre-reinforced polymer conduits, can only be used within a small temperature operating envelope. Differential expansion of the connector and the conduit when subject to temperatures outside this envelope can risk the integrity of the seal and/or the entire connection. Or, the requirement to accommodate such temperature variations and differing CTEs puts design constraints on other elements such as the O-ring. A similar issue arises when a connector has a different stiffness to that of a conduit.

However, as mentioned above, because the hub portion in examples of the present disclosure comprises continuous circumferentially-oriented fibre reinforcement, its hoop CTE (and its stiffness) can be more closely matched to that of a given fluid transfer conduit. Matching the CTE allows relative expansion (of the connector relative to the conduit) during use to be minimised over a wider range of temperatures, increasing the applicability and reliability of the part. In some examples, therefore, the composition and orientation of fibre reinforcement within the hub portion is selected such that the hoop CTE of the hub portion matches that of a fluid transfer conduit, formed from fibre-reinforced polymer (FRP), that is connected to the hub portion in use. Additionally or alternatively, the composition and orientation of the fibre reinforcement within the hub portion is selected such that the stiffness of the hub portion substantially matches that of the fluid transfer conduit.

More generally, the orientation of the continuous fibre reinforcement in the hub portion may be selected to match the orientation of continuous fibres within the fluid transfer conduit. For example, if the conduit comprises continuous fibre extending predominantly at 65° to the central axis, the continuous fibre reinforcement in the inner layer of the hub portion preferably also extends predominantly at 65° to the central axis.

The hub portion preferably comprises a tube with a substantially circular cross-section (i.e. the hub portion comprises a cylinder). A circular cross-section maximises the hoop strength of the hub portion and can be easier to manufacture. In some examples, however, the tube may have a rectangular, other polygonal or an elliptical cross-section, amongst other possible shapes. Preferably the hub portion has a cross-section which matches that of a fluid transfer conduit to which it is suitable for connecting.

The flange portion may comprise at least one through-hole which may be used along with a suitable fastening means (e.g. a nut and bolt) to secure the connector to a structure. The through-hole may be formed by drilling through a completed connector. Alternatively, the at least one through-hole may be formed at the same time as the rest of the flange portion (i.e. by using a suitably shaped mould).

The angle to the central axis at which the flange portion extends is preferably greater than 45°, and the flange portion is further preferably substantially perpendicular to the central axis of the hub portion, i.e. at 90°, to enable secure attachment to a surface normal to the central axis. In some examples the entire flange portion may not extend at the same angle to the central axis but may be shaped to accommodate the shape of a particular structure. As mentioned above, using injection moulding enables complex connector shapes to be achieved relatively inexpensively.

The thermoplastic polymer with which the continuous fibre reinforcement is impregnated is preferably the same as the thermoplastic polymer which is injected into the mould (i.e. the thermoplastic polymer that comprises the outer layer of the seal section). Suitable examples of thermoplastic polymer are polyether ether ketone (PEEK), polyetherketoneketone (PEKK), polyetherketone (PEK) or another polymer part of the polyaryletherketone (PAEK) family. The thermoplastic polymer(s) may be chosen to provide the connector with desirable chemical and/or temperature resistance properties.

During the moulding process the pre-impregnated thermoplastic polymer and the injected thermoplastic polymer may intermingle to form a contiguous polymer matrix that runs from the inner layer into the outer layer of the seal section. However, even when intermingling of polymer takes place there will still be two distinct layers present (one with continuous fibre oriented at least partially circumferentially and one without). The outer layer preferably has a radial thickness (i.e. in a radial direction perpendicular to the central axis) of 0.5 mm or more (e.g. 1 mm or more). The inner layer preferably has a radial thickness of 0.25 mm or more (e.g. 0.5 mm or more).

In some examples the outer layer of the seal portion may comprise little or no fibre reinforcement (i.e. to consist of non-reinforced polymer). This can reduce the cost of the resultant part. However, in some examples, chopped fibres (e.g. carbon or glass) may be injected with the thermoplastic polymer to form the finished connector (e.g. such that the whole connector aside from the inner layer comprises chopped fibres). The chopped fibres are preferably combined with the polymer (i.e. suspended within the polymer) before being introduced to the mould. In such examples, the outer layer will comprise chopped fibre-reinforcement.

In examples wherein the injected thermoplastic polymer does not have any fibre reinforcement (i.e. when the outer layer consists of non-reinforced polymer), there may be negligible amounts of fibre reinforcement present in the outer layer. For instance, a trivial quantity of fibre reinforcement may unintentionally spread from the inner layer during manufacture of the composite connector.

The composite connector may optionally include one or more non-fibre material additives. One or both of the injected thermoplastic polymer (i.e. that which comprises the outer layer and the other non-continuous fibre reinforced areas of the connector) and the pre-impregnated continuous fibre reinforcement may comprise one or more non-fibre material additives. For example, small quantities of one or more non-fibre material additives may be added to alter one or more non-structural properties of the polymer, such as viscosity, thermal or electrical conductivity, radiation sensitivity, colour, fire or chemical resistance etc.

For example, in aircraft fuel systems, it is important to control the conductivity of the composite connector. Ideally the fuel system (i.e. comprising one or more pipes and one or more connectors) is insulating enough to avoid becoming the preferred path for lighting conduction, whilst conductive enough to avoid static build-up due to fuel flow. Adding a particular amount of a conductive additive (e.g. carbon black, carbon nanotubes or graphene) to the polymer during manufacture of the connector allows a desired level of conductivity to be achieved. Such an additive is ideally present throughout the component (i.e. in both the injected polymer and the pre-impregnated fibre reinforcement), although this is not essential. For example, if carbon fibre reinforcement is used as the continuous fibre reinforcement, but the injected polymer contains no chopped carbon fibre reinforcement, a carbon black additive may only need to be present in the injected polymer (as the carbon fibres in the hub portion are already conductive).

To control the conductivity of the fuel system, it may not be necessary to control the conductivity of both the pipe(s) and the connector(s). It may be sufficient, in at least some cases for the conductivity of only the pipe(s) to be controlled (e.g. by adding a certain concentration of carbon black). The connector then simply needs to comprise a minimum level of conductivity for the desired overall conductivity to be achieved. Alternatively, the conductivity of the connector(s) may be controlled and used with a pipe with a minimum conductivity.

The type of fibre reinforcement used (in continuous and/or chopped form as disclosed above) may be chosen based upon one or more desired properties of the finished composite connector. For example, composite connectors requiring very high strength may utilise carbon fibres, whilst those requiring high strength but low conductivity may utilise glass fibres. In examples featuring chopped fibres in the injected thermoplastic polymer, these fibres may be of a different type to the continuous fibres in the inner layer of the seal section, although preferably they are the same.

The mould may comprise one or more features arranged to form corresponding features on the finished connector. For example, the mould may comprise at least one boss arranged to form at least one corresponding through hole in the flange portion of the resultant connector. The mould may comprise features arranged to form one or more structural features, e.g. strengthening or stiffening structures, on the resultant connector. The strengthening or stiffening structures, such as strengthening ribs, may be formed to extend between the flange portion and the hub portion. Additionally or alternatively, the mould may comprise features arranged to form one or more non-structural features on the resultant connector, such as bonding or earthing tags. The mould may comprise features arranged to form O-ring retaining ridges as part of the outer layer.

The inner and outer layers of the seal section according to the present disclosure also increase the ability for impact damage to the connector to be identified before the connector fails. In some examples the injection moulded thermoplastic polymer outer layer is less resistant to impacts than the continuous fibre-reinforced inner layer (i.e. the outer layer is able to resist a lower energy impact than the inner layer). In such examples, damage due to an impact (e.g. during maintenance or manufacture) will be visible on the outer layer before the inner layer is damaged to the point of failure. In other words, the outer layer may reach a Barely Visible Impact Damage (BVID) threshold before the inner layer is damaged beyond design tolerances.

The present disclosure refers throughout to a composite connector comprising a hub portion and a flange portion. It will be appreciated that a given connector may comprise more than one flange portion per hub portion, or more than one hub portion per flange portion. Any single-ended, double-ended or multiple port connector may be included within this disclosure.

The inventors consider the application of continuous pre-preg fibre to only one part of a tubular mould portion to be independently novel and inventive and, as such, the present disclosure also extends to a method of manufacturing a composite connector for a fluid transfer conduit, the method comprising: providing a tubular mould portion which extends substantially parallel to a central axis and comprises at least a first tubular part and a second tubular part; applying continuous fibre reinforcement, oriented at least partially circumferentially and pre-impregnated with a thermoplastic polymer, to only the first tubular part of the tubular mould portion; applying at least one further mould portion to form a complete mould in which the continuous fibre reinforcement is enclosed; injecting a thermoplastic polymer into the mould to form a connector with a tubular hub portion and a flange portion which extends from the hub portion at an angle to the central axis.

The first tubular part may correspond to a tubular seal section of the resulting connector. The first and second tubular parts preferably both extend substantially parallel to the central axis. The first tubular part may extend from an end of the second tubular part along the central axis (i.e. the tubular parts may be adjacent to each other on the central axis without overlapping). The first tubular part may be located, for example, at an end of the tubular mould portion (corresponding to an end of the resulting connector), or in close proximity to the end of the tubular mould portion.

Features of any example described herein may, wherever appropriate, be applied to any other example described herein. Where reference is made to different examples or sets of examples, it should be understood that these are not necessarily distinct but may overlap.

BRIEF DESCRIPTION OF THE FIGURES

Certain examples of the present disclosure will now be described with reference to the accompanying drawings in which.

DETAILED DESCRIPTION

Figure 1:
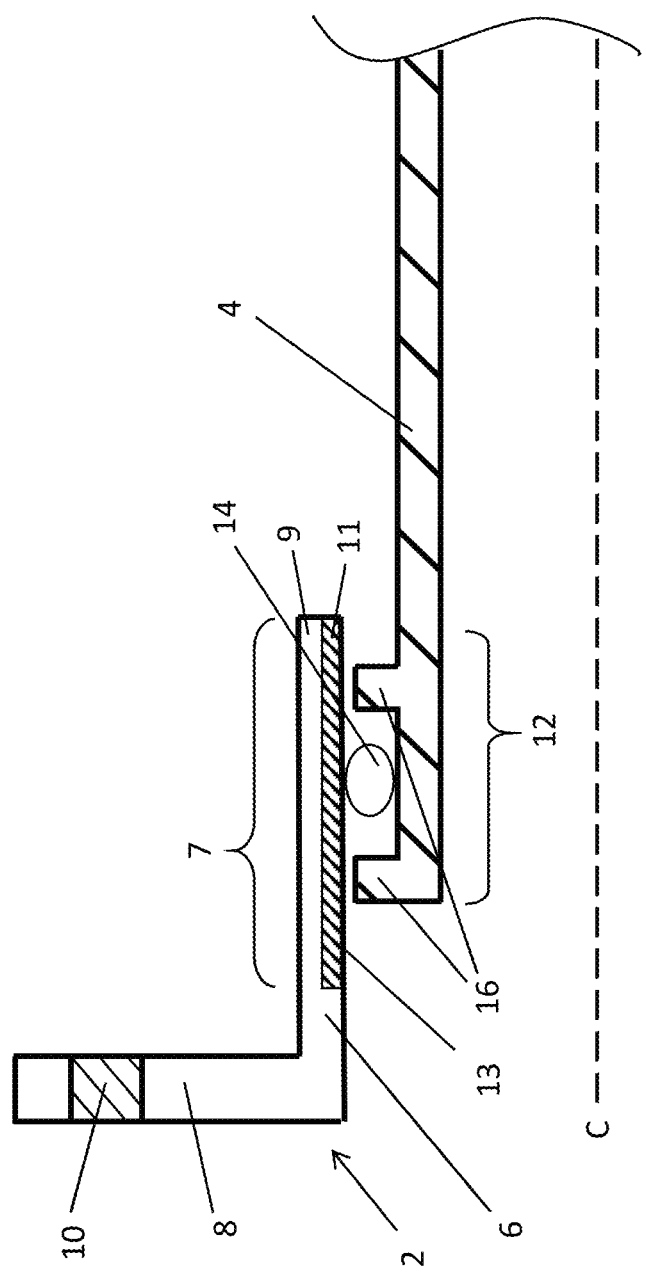
FIG. 1 is a cross sectional view of the connection between a composite connector according to the present disclosure and a fluid transfer conduit.

FIG. 1 is a cross sectional view of the interface between a connector 2 and a cylindrical fluid transfer conduit 4 that extends parallel to a central axis C. The connector 2 comprises a cylindrical hub portion 6, which also extends parallel to the central axis C, and a flange portion 8, which extends from an end of the hub portion 6 in a direction perpendicular to the central axis C. The flange portion 8 further comprises a through-hole 10, by which the connector 2 may be secured to another structure, e.g. an aircraft wing rib.

The hub portion 6 comprises a seal section 7 with an outer layer 9 and an inner layer 11 which provides a sealing surface 13 on the inside of the connector 2. The inner layer 11 (and thus the sealing surface 13) extends circumferentially around the central axis C and along the hub portion 6 parallel to the central axis C. The inner layer 11 comprises a thermoplastic polymer reinforced with continuous fibre oriented at least partially circumferentially (e.g. shown in FIG. 2). The rest of the connector 2 is formed from injection-moulded thermoplastic polymer. In this example the thermoplastic polymer is reinforced with chopped fibres (shown in FIG. 2) but this is not required.

The hub portion 6 encloses a connection portion 12 of the fluid transfer conduit 4. An elastomeric O-ring 14 is located between the seal section 7 and the connection portion 12, retained between the sealing surface 13 and an outer wall of the fluid transfer conduit 4. The O-ring 14 is confined by two retaining ridges 16 which extend radially outwards from the connection portion 10 of the fluid transfer conduit 4.

The O-ring 14 provides a seal between the connector 2 and the conduit 4, such that fluid may flow along the conduit 4 and into the connector 2 without escaping. In addition, the configuration of O-ring 14 between the connection portion 12 and the sealing surface 13 allows the fluid transfer conduit 4 to move a small distance in the direction of the central axis C relative to the connector 2 without compromising the seal. This enables a structure to which the connector 2 is secured to move or flex a small amount without imparting large stresses on the conduit 4 (as would be the case if the connector 2 was rigidly attached to the conduit 4). Instead, the conduit 4 "floats" on the O-ring 14 such that it can slide longitudinally a small distance without breaking the seal. The sealing surface 13 has a low coefficient of friction to enable the O-ring 14 to slide along the sealing surface 13 without twisting or being subject to potentially damaging shear forces. Because the sealing surface 13 extends parallel to the central axis C, the integrity of the seal is the same no matter the axial position of the conduit 4 relative to the connector 2 (as long as the O-ring 14 is located adjacent the sealing surface 13). As well as accommodating axial movement, this arrangement also permits some relative rotation around the central axis C and relative rotation away from the central axis C (i.e. bending of the joint).

For example, the structure to which the connector 2 is attached may be an aircraft wing rib, which is designed to move a small amount during flight as the wing flexes due to aerodynamic load and/or temperature fluctuations. The fluid transfer conduit 4 may comprise a fuel pipe located within the wing which must therefore be able to cope with the wing flex during flight. The inner layer 11 (and thus the sealing surface 13) has a length along the central axis C which may be chosen, for example, to accommodate an amount of axial movement corresponding to a maximum anticipated amount of wing flex. The connector 2 is also capable of coping with some articulation of the conduit 4 (i.e. rotation such that the conduit 4 is no longer parallel to the central axis C) without the seal being compromised.

Figure 2:
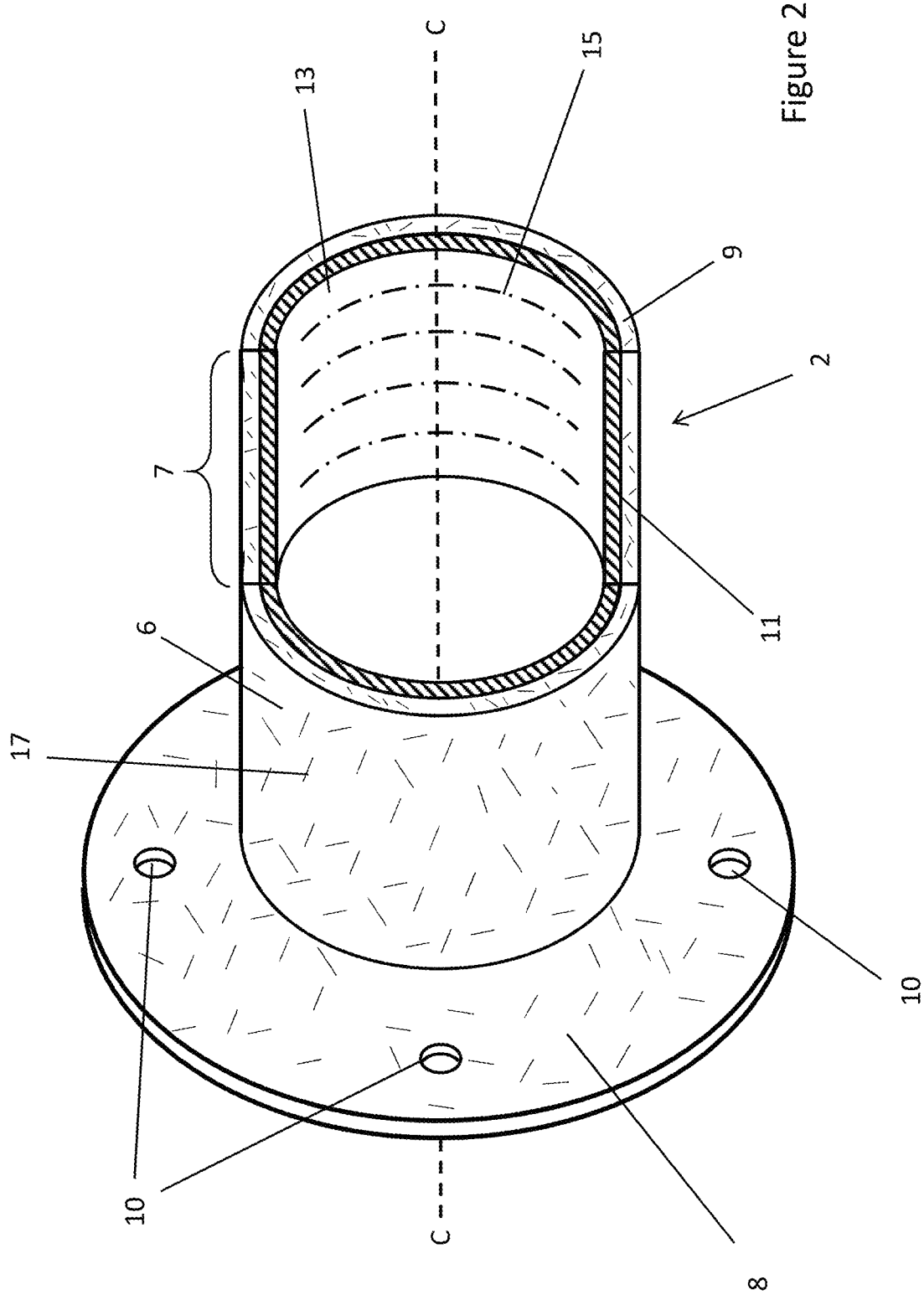
FIG. 2 is a partially cut-away perspective view of the composite connector of FIG. 1.

FIG. 2 is a schematic perspective view of the composite connector 2 shown in FIG. 1, with a partial cutaway view of the seal section 7 of the hub portion 6. From this view the continuous fibre 15 in the inner layer 11 of the seal section 7 is visible. In this example the inner layer 11 has roughly the same thickness as the outer layer 9, although this is not required.

Also shown in FIG. 2 is chopped fibre reinforcement 17 present in the outer layer 9 of the seal section 7 and throughout the rest of the connector 2. As explained below, much of the connector 2 is formed by injection moulding thermoplastic polymer infused with chopped fibre reinforcement, so the chopped fibre reinforcement 17 is evenly distributed throughout the connector 2 (aside from the inner layer 11).

Figure 3:
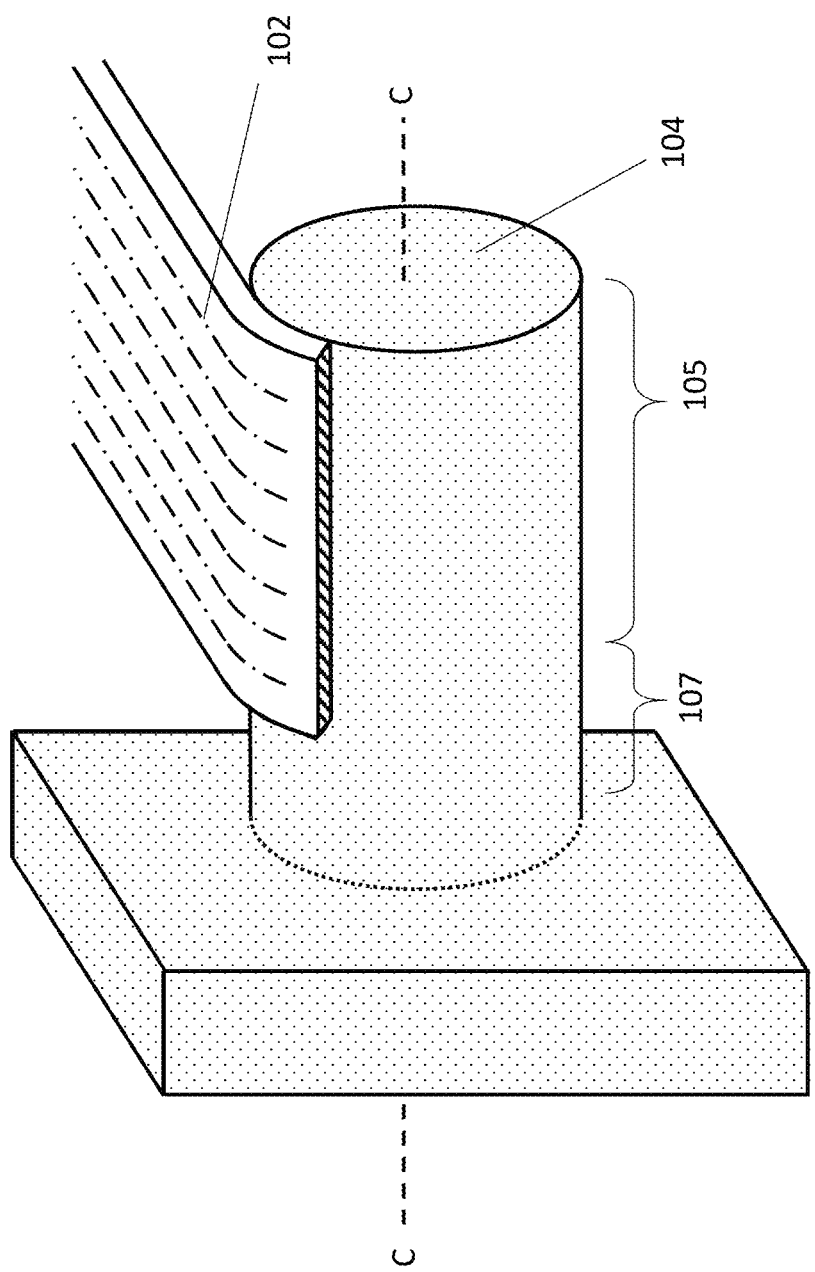
FIGS. 3-7 show various steps in a method of manufacturing a composite connector according to an example of the present disclosure.
Figure 4:
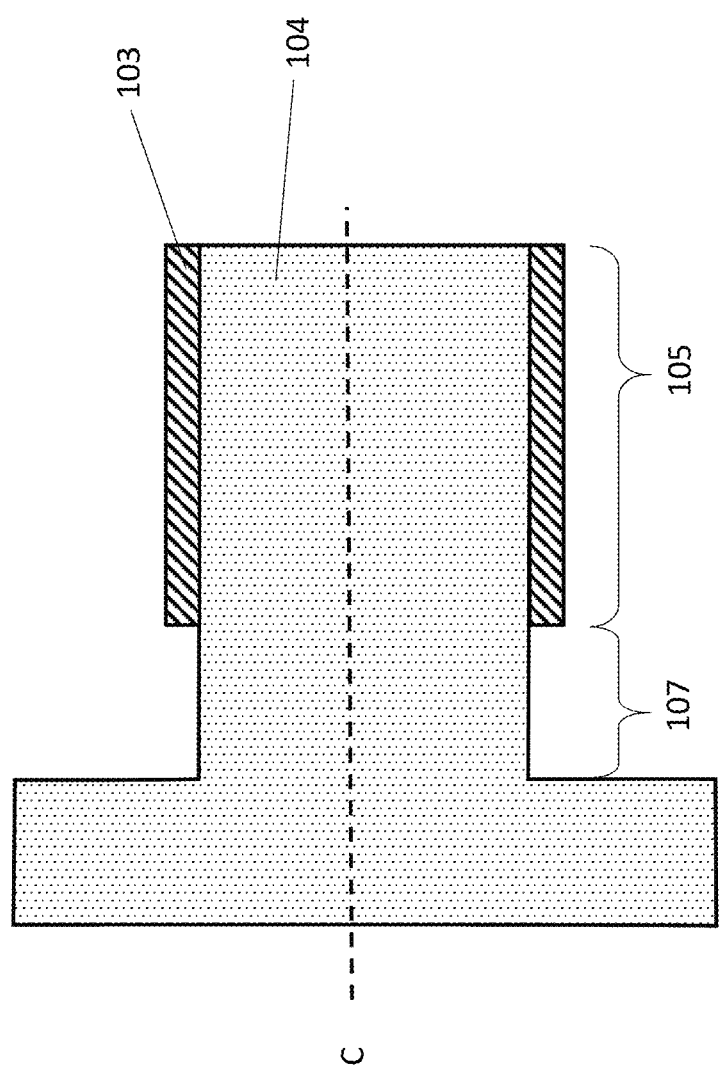

FIGS. 3 and 4 show a first step in a method of manufacturing a composite connector according to an example of the present disclosure. A sheet of continuous fibre reinforcement 102, pre-impregnated with a thermoplastic polymer, is wrapped circumferentially around a first tubular part 105 of a tubular mould portion 104, which extends parallel to a central axis C. The sheet 102 is wrapped around the first tubular part 105 of the tubular mould portion 104 one or more times to produce a layer of continuous, circumferentially-oriented pre-preg fibre reinforcement 103. A second tubular part 107 of the tubular mould portion 104 has no fibre reinforcement applied thereto.

Figure 5:
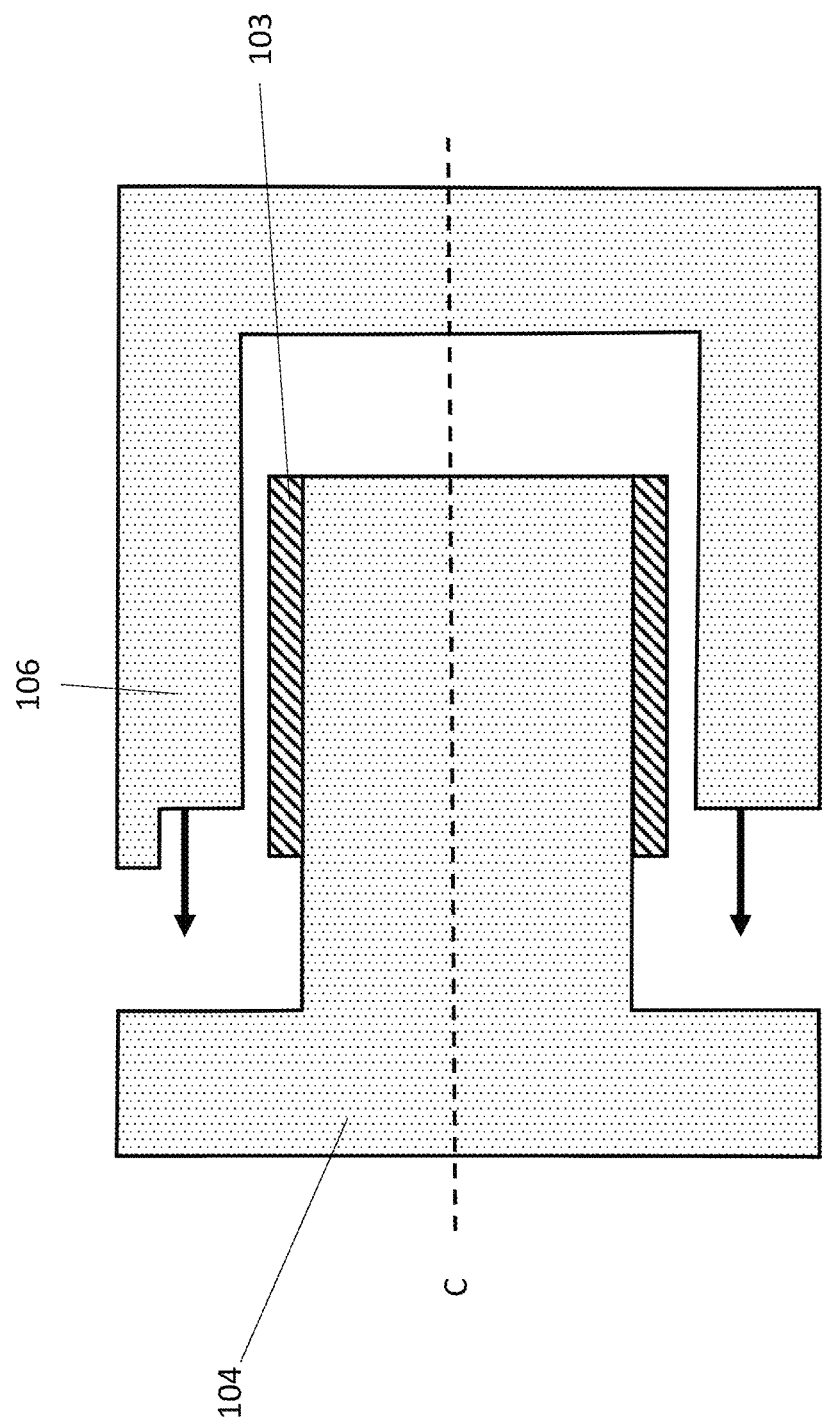
Figure 6:
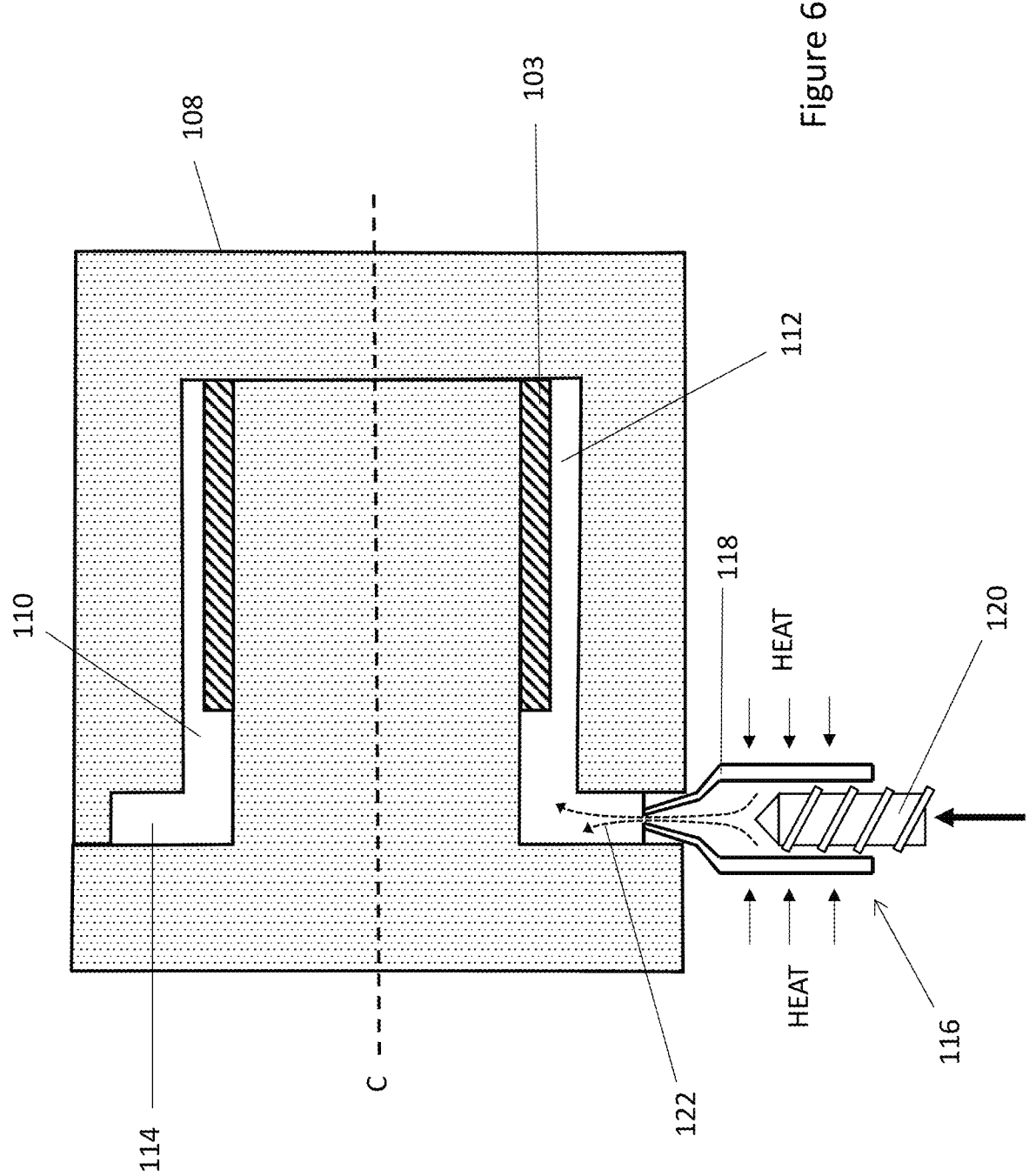

As seen in FIGS. 5 and 6, a further mould portion 106 is then placed over the tubular mould portion 104 to form a complete mould 108 with a cavity 110 in which the pre-preg fibre reinforcement 103 is enclosed. The cavity 110 comprises a hub-forming portion 112, in which the fibre reinforcement 103 is located and a flange-forming portion 114 which extends from the hub-forming portion 112 at an angle (in this case 90°) to the central axis C. Although it is not shown in this example, the flange and/or hub forming portions may comprise additional shapes and/or features to form corresponding features on the finished connector (a boss in the flange-forming portion 114 may be used to form a corresponding through-hole in the flange of the resultant connector).

An injection tool 116 comprising a chamber 118 and a screw 120 is used to inject molten thermoplastic polymer 122 reinforced with chopped fibre (not shown) into the mould 108. The injection tool 116 is heated to melt the thermoplastic polymer 122 (e.g. provided as solid pellets) and the screw 120 is rotated to force the molten thermoplastic polymer 122 and its chopped fibre reinforcement into the mould 108 such that it fills the cavity 110.

As the polymer 122 is injected, the heat of the molten polymer 122 and the pressure with which it is injected consolidates the layer of continuous, circumferentially-oriented pre-preg fibre reinforcement 103, removing any inter-laminar voids that may be present.

Figure 7:
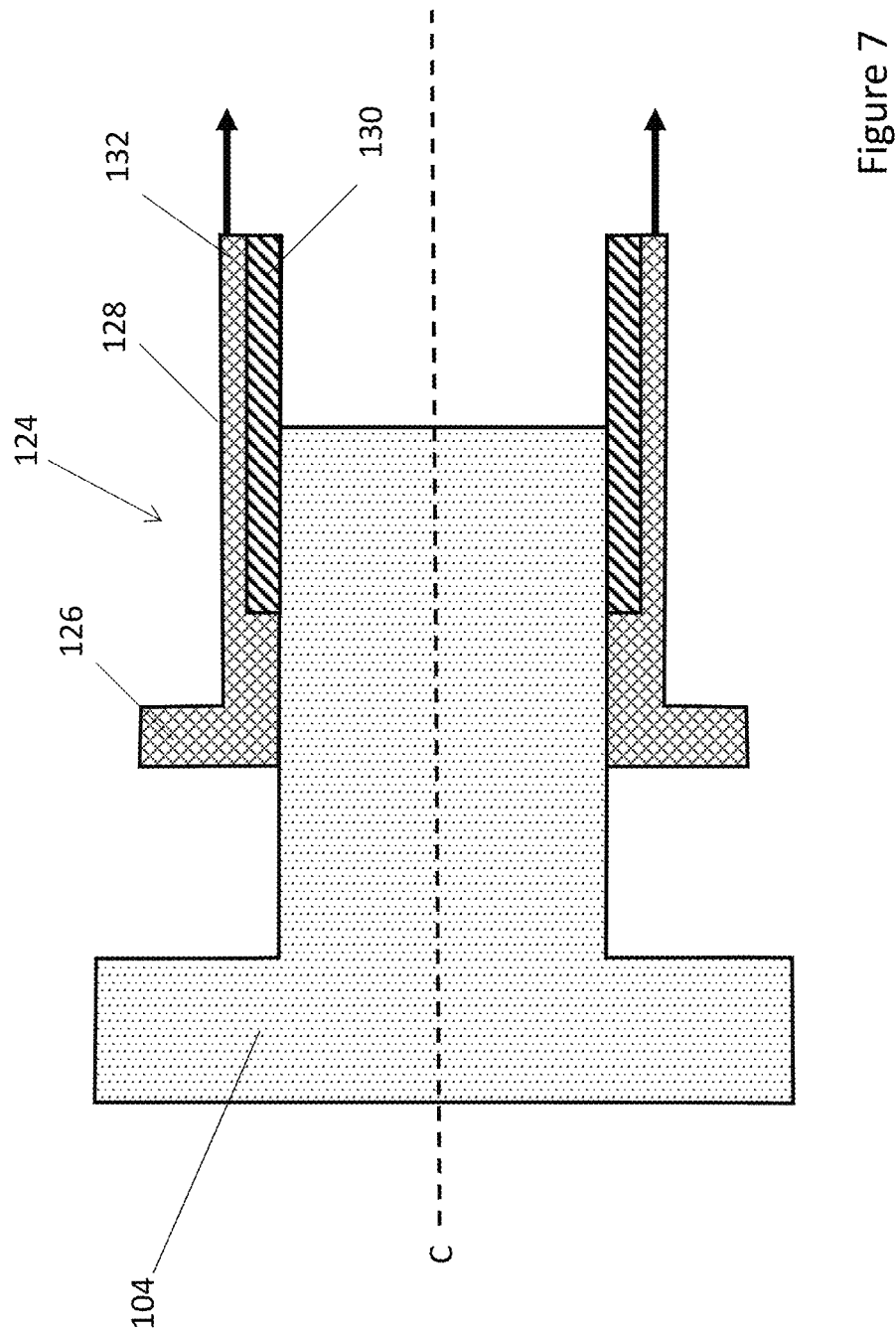

Once the cavity 110 is filled with the chopped-fibre reinforced thermoplastic polymer 122, and the pre-preg fibre reinforcement 103 is sufficiently consolidated, the mould 108 and its contents is allowed to cool and the injected thermoplastic polymer 122 solidifies. The coefficient of thermal expansion (CTE) of the (typically metal, e.g. aluminium) mould is greater (e.g. 50×10-6 K-1 for aluminium) than that of the pre-preg fibre reinforcement 103 (e.g. roughly zero for carbon fibre-reinforcement). Thus, as the mould 108 and its contents cools, the inner pre-preg layer undergoes little or no contraction whilst the tubular portion 104 shrinks inwards and thus away from the pre-preg fibre reinforcement 103. This allows the resulting connector 124 to be extracted easily from the mould 108 (i.e. without requiring a tapered hub portion). As shown in FIG. 7, the further mould portion 106 is removed (e.g. by splitting the further mould portion 106 into two parts) and the finished connector 124 extracted from the tubular first mould portion 104 by sliding it in the direction of the central axis C.

As described in more detail with reference to connector shown in FIG. 1, the finished connector 124 comprises a flange portion 126 (formed by the flange-forming portion 114) and a hub portion 128 (formed by the hub-forming portion 112), with the latter comprising an inner layer 130 of continuous circumferentially oriented fibre reinforcement (formed by the pre-preg continuous fibre reinforcement 103) and an outer layer 132 of chopped-fibre-reinforced thermoplastic polymer (formed by the injected polymer 122).

Figure 8:
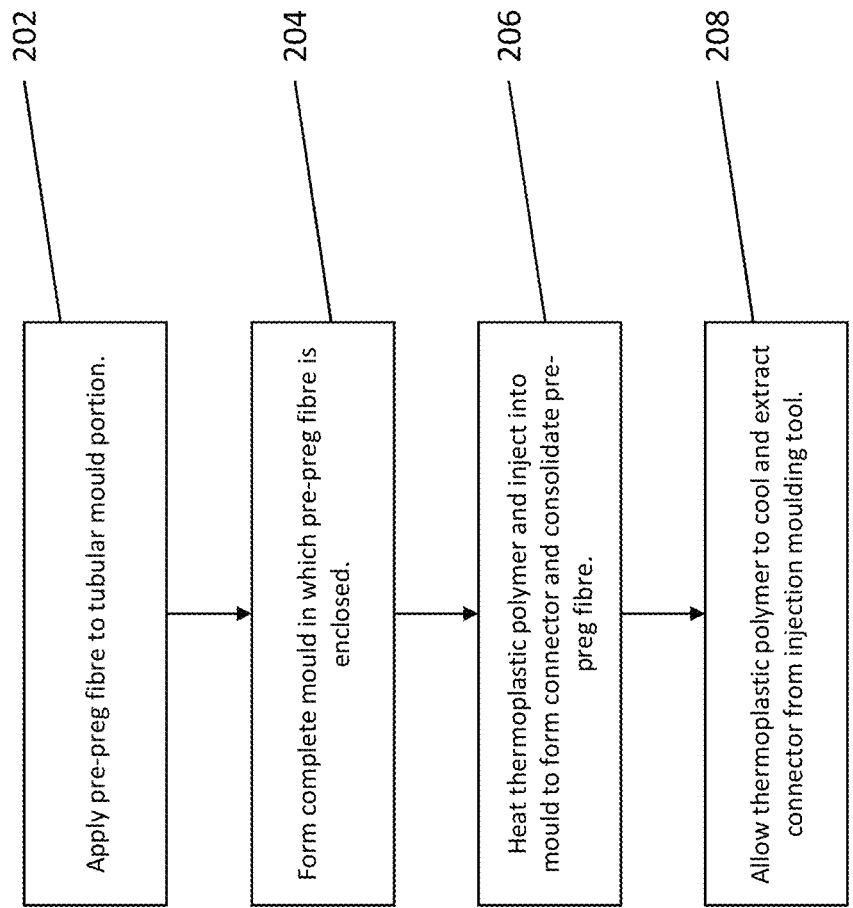
FIG. 8 is a flow diagram detailing various steps in a method of manufacturing a composite connector according to an example of the present disclosure.

A method of manufacturing a composite connector for a fluid transfer conduit according to an example of the present disclosure will now be described with reference to FIG. 8. First, in step 202, continuous fibre pre-impregnated with a thermoplastic polymer is applied to a tubular mould portion that extends parallel to a central axis to form a layer of continuous, circumferentially-oriented pre-preg fibre reinforcement.

At least one further mould portion is then applied to form a complete mould in step 204. The continuous, circumferentially-oriented pre-preg fibre reinforcement is enclosed within the mould.

Subsequently, in step 206, a thermoplastic polymer is heated and injected into the mould such that it fills the mould to form a connector with a tubular hub portion and a flange portion which extends from the hub portion at an angle to the central axis.

The heat and pressure of the injected polymer also serves to consolidate the continuous pre-preg fibre layer (e.g. removing inter-laminar voids). In step 208 the thermoplastic polymer is allowed to cool (which may typically take only a few seconds), and the connector may be extracted.

The invention claimed is:

1. A composite connector for a fluid transfer conduit comprising:
   a tubular hub portion which extends substantially parallel to a central axis and comprises a tubular seal section; and
   a flange portion which extends from the hub portion at an angle to the central axis;
   wherein the seal section of the hub portion comprises an inner layer and an outer layer, the inner layer comprising thermoplastic polymer reinforced with continuous fibre oriented at least partially circumferentially and the outer layer comprising injection-moulded thermoplastic polymer; and
   wherein the continuous fibre is present only in the tubular hub portion.

2. The composite connector according to claim 1, wherein the inner layer provides a sealing surface which is parallel to the central axis across an axial seal length.

3. The composite connector according to claim 2, wherein the sealing surface has a low coefficient of friction.

4. The composite connector according to claim 1, wherein the outer layer has a radial thickness of at least 0.5 mm.

5. The composite connector according to claim 1, wherein the outer layer further comprises chopped fibre reinforcement.

6. The composite connector according to claim 1, wherein the composite connector includes one or more non-fibre material additives.

7. The composite connector according to claim 5, wherein the chopped fibre reinforcement comprises glass and/or carbon fibres.

8. The composite connector according to claim 1, wherein the outer layer of the seal section is less resistant to impacts than the inner layer of the seal section.

9. The composite connector according to claim 1 in combination with a fibre-reinforced polymer fluid transfer conduit connected to the hub portion to form a connection system.

10. The composite connector according to claim 9, where the connection system further comprises an elastomeric O-ring positioned between the fluid transfer conduit and the hub portion to seal a connection between the connector and a fluid transfer conduit.

11. The composite connector according to claim 1, wherein the continuous fibre reinforcement comprises glass or carbon fibres.

* * * * *